(12) United States Patent
Esposito et al.

(10) Patent No.: US 12,422,168 B2
(45) Date of Patent: Sep. 23, 2025

(54) SPECTRALLY SELECTIVE SOLAR ABSORBER COATING

(71) Applicant: AGENZIA NAZIONALE PER LE NUOVE TECNOLOGIE, L'ENERGIA E LO SVILUPPO ECONOMICO SOSTENIBILE (ENEA), Rome (IT)

(72) Inventors: Salvatore Esposito, Rome (IT); Antonio D'Angelo, Rome (IT); Claudia Diletto, Rome (IT); Giorgio Graditi, Rome (IT); Antonio Guglielmo, Rome (IT)

(73) Assignee: AGENZIA NAZIONALE PER LE NUOVE TECNOLOGIE, L'ENERGIA E LO SVILUPPO ECONOMICO SOSTENIBILE (ENEA), Rome (IT)

(*) Notice: Subject to any disclaimer, the term of this patent is extended or adjusted under 35 U.S.C. 154(b) by 430 days.

(21) Appl. No.: 18/006,085

(22) PCT Filed: Jul. 30, 2021

(86) PCT No.: PCT/IB2021/056974
§ 371 (c)(1),
(2) Date: Jan. 19, 2023

(87) PCT Pub. No.: WO2022/024064
PCT Pub. Date: Feb. 3, 2022

(65) Prior Publication Data
US 2023/0349595 A1 Nov. 2, 2023

(30) Foreign Application Priority Data
Jul. 30, 2020 (IT) .................. 102020000018676

(51) Int. Cl.
*F24S 70/225* (2018.01)
*F24S 70/30* (2018.01)

(52) U.S. Cl.
CPC ............. *F24S 70/225* (2018.05); *F24S 70/30* (2018.05)

(58) Field of Classification Search
CPC ................. F24S 70/225; F24S 70/30
(Continued)

(56) References Cited

U.S. PATENT DOCUMENTS 8,555,871 B2 10/2013 Dreyer et al.
9,222,703 B2 * 12/2015 Dasbach ................ B23K 26/18
(Continued)

FOREIGN PATENT DOCUMENTS

CN 204165260 U 2/2015
CN 109594050 A 4/2019
(Continued)

OTHER PUBLICATIONS

International Search Report and Written Opinion from International Application No. PCT/IB2021/056974 mailed Nov. 26, 2021.

*Primary Examiner* — Avinash A Savani
(74) *Attorney, Agent, or Firm* — Ballard Spahr LLP (57) ABSTRACT

A solar absorber coating for a receiver element of a solar thermal or thermodynamic system. An additional aspect is a receiver for solar thermal or thermodynamic systems comprising a coating. The receiver may be an evacuated receiver pipe or a non-evacuated or air-operating receiver pipe.

18 Claims, 1 Drawing Sheet

(58) Field of Classification Search
USPC .......................................................... 126/676
See application file for complete search history.

(56) References Cited

U.S. PATENT DOCUMENTS

| | | | |
|---|---|---|---|
| 9,423,157 B2* | 8/2016 | Villuendas Yuste | F24S 70/25 |
| 9,469,896 B2 | 10/2016 | Antonaia et al. | |
| 2018/0076342 A1* | 3/2018 | Liu | C23C 14/0676 |

FOREIGN PATENT DOCUMENTS

| | | |
|---|---|---|
| CN | 110895058 A | 3/2020 |
| DE | 102013112532 A1 | 5/2015 |
| EP | 0847965 B1 | 10/2004 |
| WO | 2017162252 A1 | 9/2017 |

* cited by examiner

SPECTRALLY SELECTIVE SOLAR ABSORBER COATING

CROSS-REFERENCE TO RELATED APPLICATIONS

This Patent Application is a U.S. national stage of PCT International Application No. PCT/IB2021/056974 filed on Jul. 30, 2021, which claims priority from Italian Patent Application No. 102020000018676 filed on Jul. 30, 2020, the entire disclosure of each of which is incorporated herein by reference.

TECHNICAL SECTOR

This invention relates to a spectrally selective solar absorber coating for a receiver of a solar thermal or thermodynamic system.

In particular, this invention finds advantageous, but not exclusive, application, for a pipe-shaped receiver, to which the following description explicitly refers without any loss of generality thereby.

In what follows in this document, "metal" refers to a metal or a metal alloy; whereas a "material with metallic behaviour" refers to a material, other than a metal or a metal alloy, but in any case, characterized by good conductivity and a high optical absorption coefficient; transition metal nitrides and transition metal alloy nitrides, provided in some embodiments of the invention, are metallic behaviour materials in the sense indicated.

PRIOR ART

In solar thermal or thermodynamic systems, solar radiation is collected by means of a solar collector and converted into heat in a receiver element, inside which a heat transfer fluid flows. The heat, stored and transported by the heat transfer fluid, can be used as such (solar thermal plants) potentially transferring it to another process fluid, or it can be transformed into electricity (solar thermodynamic plants) by means of thermodynamic cycles "fed" by the solar source.

With particular reference to solar thermal or thermodynamic systems with parabolic or Fresnel linear manifolds, the receiver has a tubular shape and is one of the most technological components of the entire solar system. The receiver pipe must absorb as much solar radiation as possible concentrated on it and, at the same time, must disperse as little heat as possible toward the outside environment.

Such a function is performed by a particular surface coating applied on the metal pipe (typically made of steel) within which the heat transfer fluid flows and indicated in what follows with the term "substrate". In order to perform this function effectively, the surface coating of the receiver must have optical properties of reflectance, absorbance, and emissivity that vary according to wavelength. In particular, in order to obtain a solar receiver with high photothermal efficiency, the coating must have a behaviour as close as possible to the ideal one, i.e., zero reflectance (unit absorbance) in the spectral region of solar radiation (0.3-2.0 µm) and unit reflectance (zero absorbance and emissivity) in the spectral region of thermal infrared (2.0-40 µm), with a step cut-off between the two regions. As said, when reference is made to the coatings in question, the use of the term "spectrally selective absorber coating" for solar receivers is well established.

To achieve such a behaviour, the spectrally selective absorber coating is generally formed of a complex, multilayer structure of thin films of different materials in which each layer contributes, with different optical properties, to the desired performance of high solar absorbance ($\alpha_s$) and low thermal emissivity at receiver operating temperatures ($\varepsilon_{th}$) or, overall, the high photothermal conversion efficiency ($\eta_{pt}$) of the coating.

Generally, the spectrally selective multilayer structure has "cermet technology". The acronym "cermet" identifies a class of composite materials consisting, predominantly, of a ceramic phase and a metal phase nanodispersed in each other. The metal phase may be made of a metal or a metallic behaviour material. The particular structure of the cermet materials gives them optical properties of high absorption in the spectral region of solar radiation (0.3-2.0 µm) and good transparency in the spectral region of thermal infrared (4.0-40 µm). Such optical properties therefore confer a behaviour close to the ideal one described above.

Generally, a cermet-technology solar absorber coating comprises a first layer, consisting of a material with a high reflectance in the infrared spectral region, and one or more layers consisting of a cermet material that absorbs the solar radiation hitting the receiver and, at the same time, that is transparent to infrared radiation so as not to interfere with the infrared reflectance function of the first layer.

In the context of this invention, a division of the metals according to their infrared reflectance power is included below:

high reflectance metals: Au, Ag, Cu and Al;
medium-high reflectance metals: Mo, $\alpha$-W
medium reflectance metals: Ti, V, Cr, Zr, Nb, Hf, Ta, $\beta$-W; binary or ternary alloy of Ti, V, Cr, Zr, Nb, Mo, Hf, Ta, W; nitrides of Ti, V, Cr, Zr, Nb, Mo, Hf, Ta, W; nitrides of binary and ternary alloys of Ti, V, Cr, Zr, Nb, Mo, Hf, Ta, W.

The first layer has the function of ensuring a low emissivity value of the solar coating so as to minimize the thermal losses due to irradiation of the receiver. The materials suitable for this purpose are metals that, in any case, have a highly reflective behaviour even in the solar spectrum region. For this reason, the layers made of cermet material are applied to the first metal layer, which, as mentioned above, absorb the solar radiation.

The behaviour of the layers made of cermet material varies as the content of the metal component in the cermet varies. In fact, as the metal component increases, the absorption power of the cermet increases but, at the same time, its transparency in the infrared region decreases. For this reason, during the production of the absorbing layer of the solar coating, the thicknesses and the metal content of the cermets must be chosen so as to make the best use of the reflectance power of the infrared reflector and, at the same time to have a steep transition from the solar spectrum region to the infrared region. In order to best perform this function, the cermet absorbing layers typically have a decreasing metal component content moving away from the infrared reflector.

Finally, the solar coating ends with one or more layers with an anti-reflection filter function, which are transparent in the infrared region, whose function is to minimize the solar radiation reflected by the receiver.

In brief, the absorber coatings for receiver pipes of solar thermal or thermodynamic systems are generally composed of a multilayer structure comprising:

a metal layer with infrared reflector function of the absorber coating;

one or more cermet layers applied to the metal layer, with solar absorber function;

one or more typically ceramic layers, applied to the cermet layers, with an anti-reflection filter function.

The metal layer with infrared reflector function, besides having the function of reflecting in infrared, must also possess good structural and chemical-physical stability, good adhesion to the substrate on which it is applied, low elemental diffusion coefficient inside the above layers and, finally, a good capacity for blocking the diffusion of migrant elements from the substrate on which it is applied.

Materials that meet the above requirements include those that have been defined above as medium reflectance, such as Ti, V, Cr, Zr, Nb, Hf, Ta, W; binary or ternary alloy of Ti, V, Cr, Zr, Nb, Mo, Hf, Ta, W; Ti, V, Cr, Zr, Nb, Mo, Hf, Ta, W nitrides; nitrides of binary and ternary alloys of Ti, V, Cr, Zr, Nb, Mo, Hf, Ta, W.

In contrast, metals defined as high reflectance, such as Au, Ag, Cu, Al, although they offer the best performance in terms of high spectral reflectance, are, in any case, difficult to apply due to their poor properties in terms of structural and chemical-physical stability, as well as adhesion to the substrate, elemental diffusion, and barrier. The poor ability to act as an adhesion layer and as a barrier layer makes the reliable use of Au, Ag, Cu and Al as a metal layer with infrared reflector function of a solar absorber coating for medium-high and high temperature applications problematic, including taking into account that this behaviour deteriorates considerably as the temperature increases.

In this regard, the need was felt to have a solar absorber coating that would allow the use of the above-mentioned high or medium-high reflectance metals at higher operating temperatures in order to improve, at these temperatures, the photothermal performance of the coating.

Moreover, an additional need was felt to increase the stability of a solar absorber coating made of the above-mentioned high or medium-high reflectance metals in order to ensure less performance degradation during the whole service life of the receiver or a longer life for the component.

The inventors of this invention have provided a solar absorber coating capable of meeting both the above-mentioned requirements. The technical characteristics of the coating of this invention are such as to increase the structural stability of the above-mentioned high or medium-high reflectance metals, once they are inserted inside the multilayer coating.

Such an increase in structural stability results, compared to the prior art, in higher use temperatures for the above-mentioned high or medium-high reflectance metals, obtaining a solar absorber coating with improved photothermal performance at these temperatures.

Moreover, this increase in structural stability makes it possible to obtain an absorber coating, made of the above-mentioned high or medium-high reflectance metals, subject to less performance degradation during the whole service life of the receiver or a longer life for the component.

Finally, the solar absorber coating that is the subject of this invention also offers the important advantage of being versatile for effective use both in "evacuated receiver pipes", operating at up to at least 550° C., and in "non-evacuated receiver pipes" or in "air-operating receiver pipes", at up to at least 300° C.

SUBJECT OF THE INVENTION

The subject of this invention is a solar absorber coating for a receiver element of a solar thermal or thermodynamic system, the essential characteristics of which are set forth in claim 1, and the preferred and/or auxiliary characteristics of which are set forth in claims 2 to 11.

An additional subject of the invention is a receiver for solar thermal or thermodynamic systems comprising a coating according to this invention. More particularly, the receiver is an evacuated receiver pipe or a non-evacuated or air-operating receiver pipe.

The term "evacuated receiver pipe" refers to a receiver consisting of: an inner pipe (generally made of steel) on the outer surface of which an absorber coating is applied, an outer glass pipe with anti-reflection treatment, two vacuum-tight glass-metal joints, and compensating elements (bellows) for the differential thermal expansions between the inner pipe and the glass pipe. A vacuum, preferably lower than $1 \times 10^{-4}$ mbar, is formed inside the space created between the inner pipe and the outer glass pipe.

The term "non-evacuated receiver pipe" refers to a receiver configured as the "evacuated receiver pipe", with the difference that in the space created between the inner pipe and the outer glass pipe there is no vacuum.

The term "air-operating receiver pipe" refers to a receiver consisting of just the steel pipe on the outer surface of which the absorber coating is applied.

In the case of solar plants, in particular solar thermal plants operating at up to 300° C. typically used for the production of process heat, the solution of the non-evacuated pipe or of the air-operating pipe can be highly attractive. In fact, in view of a reduced solar field efficiency due to greater thermal losses of the receiver, the solution of the non-evacuated pipe or, in particular, of the air-operating pipe is advantageous due to its decisive reduction in the plant cost and a simple and robust component structure.

BRIEF DESCRIPTION OF THE DRAWINGS

The invention will now be described according to embodiments for explanatory and non-limiting purposes with the aid of the accompanying drawings in which.

PREFERRED EMBODIMENT OF THE INVENTION

The following is a list of the parts shown in the accompanying drawings:
1 Substrate;
2 Spectrally selective solar absorber coating;
21 Infrared reflecting base layer;
22 Multifunction structure;
22a Additional infrared reflecting layer;
22b Stabilizing layer;
23 Absorbing multilayer cermet structure;
24 Anti-reflection multilayer structure
3 Heat transfer fluid For a simpler and clearer representation, the elements shown have not necessarily been drawn to scale in the accompanying drawings. For example, for clarity, the dimensions of some of the elements may be enlarged or reduced in comparison to other elements.

In particular, the thickness of the individual layers and of the multilayer structures of the spectrally selective solar absorber coating that is the subject of the invention are enlarged and not necessarily to scale; moreover, in the accompanying drawings, the thickness of the substrate 1 is also not shown to scale compared to the elements (layers, multilayer structures) of the spectrally selective solar absorber coating 2.

Finally, where deemed convenient, the reference numbers may be repeated between the drawings and in the same drawing to indicate corresponding or similar elements. By way of example, in FIG. 2, the reference numbers 22a and 22b are repeated several times and indicate elements of the multifunction structure 22 that are similar (as to function) but not necessarily identical (as to constituent materials and thickness). The layers 22a are all additional infrared reflecting layers, but each layer 22a of FIG. 2 can be different by type of constituent metal and thickness of the layer. The stabilizing layers 22b may be ceramic or cermet or metal or metallic behaviour; each single stabilizing layer 22b of FIG. 2, independently of the other stabilizing layers 22b, may be ceramic or cermet or metal or metallic behaviour and, within the same class of materials (e.g., class of ceramic materials), may be made of a different material; the thickness of the various stabilizing layers 22b may also be different from each other.

Figure 1:
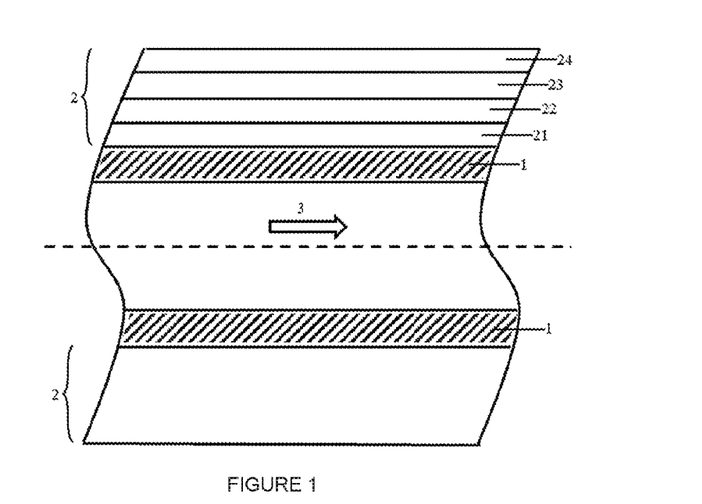
FIG. 1 schematically illustrates a cross-section view of a spectrally selective absorber coating according to a general embodiment of the invention, applied to the surface of a substrate.

With reference to the accompanying drawings, FIG. 1 schematically illustrates a cross-section view of a spectrally selective solar absorber coating 2 according to an embodiment of the invention; in FIG. 1, the coating 2 of the invention is applied on the surface of a tubular substrate 1 and comprises, applied in sequence: an infrared reflecting multilayer structure comprising an infrared reflecting base layer 21 and a multifunction structure 22, an absorbing multilayer cermet structure 23 and an anti-reflection multilayer structure 24. A heat transfer fluid 3 flows inside the receiver pipe.

Figure 2:
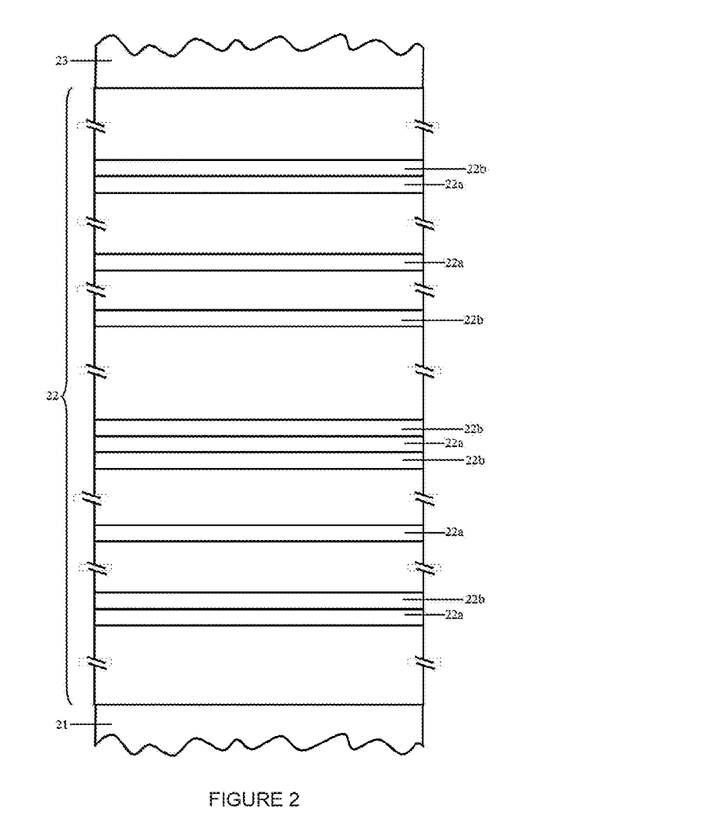
FIG. 2 schematically illustrates a cross-section view of the multifunctional structure of a spectrally selective absorber coating according to a general embodiment of the invention.

FIG. 2 schematically illustrates a cross-section view of the multifunction structure 22.

In FIG. 2, the multifunction structure 22 consists of some additional infrared reflecting layers 22a and of some stabilizing layers 22b that can be ceramic and/or cermet and/or metal and/or metallic behaviour.

In FIG. 2, in accordance with the previous FIG. 1 and with what is stipulated by the invention, the multifunction structure is comprised between the infrared reflecting base layer 21 and the absorbing multilayer cermet structure 23.

Infrared Reflecting Base Layer 21

As previously pointed out, in the invention the infrared reflecting base layer 21 has the infrared reflector function of the absorber coating 2, of a barrier layer and of an adhesion layer for the multifunction structure 22 above. In some embodiments of the invention, one function could prevail over the others.

The essential characteristics of an infrared reflecting material, which can be used in an absorber coating that must operate in a vacuum at a high temperature (T≥550° C.) and in air at a medium temperature (T≥300° C.) are listed below in general terms:

a. high spectral reflectance in the range 2.0-40 µm;
b. structural and chemical-physical stability in a vacuum (generally at p≤1×10$^{-4}$ mbar), at the operating temperature of the absorber coating of at least structures;
c. structural and chemical-physical stability in air, at the operating temperature of the absorber coating of at least 300° C.;
d. adhesion to the substrate;
e. low elemental diffusion coefficient of the material constituting the infrared reflector inside the layers above, at the operating temperature of the absorber coating;
f. capacity to act as a barrier layer, at the operating temperature of the absorber coating, for the diffusion of elements migrating from the substrate on which the absorber coating is applied.

Among the metal materials and the metallic behaviour materials, there are many able to meet most of the characteristics listed above; however, none of them is able to meet all of them at the same time; hence, the choice of identifying first of all, as an infrared reflecting base layer, metal materials or metallic behaviour materials capable of ensuring structural and chemical-physical stability to the entire absorber coating under the operating conditions required by the target application. In other words, these metal materials or metallic behaviour materials must have, in the operating conditions of the absorber coating, good structural and chemical-physical stability, good adhesion to the substrate on which they are applied, a low elemental diffusion coefficient inside the above layers and, finally, good capacity for blocking the diffusion of migrant elements from the substrate on which the metal material or metallic behaviour material is applied. Many transition metals and their binary and ternary alloys have the characteristics indicated above; in particular, as an infrared reflecting base layer, one of the following transition metals Ti, V, Cr, Zr, Nb, Mo, Hf, Ta, W can be selected, or a binary or ternary alloy of the above-mentioned transition metals. The nitrides of Ti, V, Cr, Zr, Nb, Mo, Hf, Ta, W, as well as the nitrides of their binary and ternary alloys, are materials that have characteristics that mean they can be used as an infrared reflecting base layer.

The W has two crystalline phases: the W in phase α can be inserted between the medium-high reflectance materials, while the W in phase β between the medium reflectance materials.

Ti, Zr, Mo, W, TiN and ZrN are the preferred candidates for constituting the infrared reflecting base layer 21 of the invention. In fact, these materials can effectively perform the functions of first infrared reflector, barrier layer, and adhesion layer. In addition, they possess excellent structural and chemical-physical stability at a high operating temperature and are characterized by low elemental diffusion coefficients.

In summary, the invention requires that the infrared reflecting base layer 21 is composed of a transition metal selected from among Ti, V, Cr, Zr, Nb, Mo, Hf, Ta, W or from a binary or ternary alloy of the above-mentioned transition metals or from a nitride of one of the above-mentioned transition metals or from a nitride of a binary or ternary alloy of the above-mentioned transition metals.

The thickness of the infrared reflecting base layer 21 ranges between 1 and 250 nm, preferably between 90 and 150 nm. In this way, it is ensured that the layer can effectively perform the functions of first infrared reflector, barrier layer, and adhesion layer.

According to some preferred embodiments of the invention, the infrared reflecting base layer 21 consists of: Ti, Zr, Mo, W, TiN and ZrN.

Multifunction Structure 22

As noted above, in the invention, a multifunction structure 22 is applied to the infrared reflecting base layer 21.

This multifunction structure 22 consists of one or more additional infrared reflecting layers 22a and at least one or more stabilizing layers 22b consisting of ceramic or cermet or metal or metallic behaviour material or of a combination of the same layers.

The additional infrared reflecting layers 22a have the function of increasing the infrared reflectance of the infrared reflecting base layer 21 and, consequently, of the entire absorber coating 2, or of improving its thermal emissivity. In light of what has already been discussed, the metals that can be used to perform the function of increasing the infrared reflectance of the absorber coating 2 are those:
  a. with high reflectance (Au, Ag, Cu and Al), where the infrared reflecting base layer 21 is made of a medium or medium-high reflectance material;
  b. with medium-high reflectance (Mo, α-W), where the infrared reflecting base layer 21 is made of a medium reflectance material.

With reference to the high reflectance metals, Au, Ag, Cu and Al have very high reflectance values already starting from the near infrared (1.0-2.0 μm) and this enables an optical "cut-off" with a very steep rise in passing from the solar absorbance zone to that of thermal emissivity; this behaviour is advantageous from the point of view of the spectral selectivity of the absorber coating, allowing low emissivity values, including in the presence of high operating temperatures. In addition, the use of Au, Ag, Cu and Al remains advantageous for the limited variations of the refractive index (n) and of the extinction coefficient (k) of these metals as the temperature increases, with consequent reduced reduction of the spectral infrared reflectance and reduced deterioration of the thermal emissivity, even at high operating temperatures.

As mentioned, from the point of view of the optical properties Au, Ag, Cu and Al are the metals of choice to increase the infrared reflectance of an absorber coating or to improve the thermal emissivity thereof.

In view of the advantageous optical behaviour of Au, Ag, Cu and Al, these metals have:
  very poor surface adhesion properties on the material typically used for the part of the solar receiver that acts as a substrate for the absorber coating, and in particular poor adhesion on steel;
  poor ability to act as a barrier layer with respect to the diffusion of elements migrating from the substrate on which the absorber coating is applied, and in particular of the steel alloying elements.

The poor ability to act as an adhesion layer and as a barrier layer prevents the use of Au, Ag, Cu and Al as a first layer of a solar absorber coating for medium-high and high temperature applications, including taking into account that this behaviour deteriorates considerably as the temperature increases.

On the basis of the above, the use of Ag, Al, Cu, Au in the multifunction structure 22, in order to increase the low-emission thermal performance of the spectrally selective solar absorber coating 2, always requires the presence of an underlying layer that acts as an adhesion layer and as a barrier layer: the invention expressly provides that this function is performed by the infrared reflecting base layer 21 made of materials suitably selected for the purpose. In other words, the interposition of the infrared reflecting base layer 21, of suitably selected material, between the substrate 1 and the multifunction structure 22 improves adhesion on the steel (or on other material constituting the substrate) and provides an effective barrier effect against the diffusion of elements coming from the material of the substrate.

In addition to the problems already noted, Au, Ag, Cu and Al are subject to a series of intrinsic phenomena strongly dependent on temperature, such as crystalline reorientation and variation in the size of the crystalline grain:
  Au, Ag, Cu and Al, deposited in the form of a thin film, have an "as-grown" preferential crystalline orientation and a series of secondary orientations; at a high temperature, these metals may undergo crystalline reorientation, i.e., recrystallization, with structural modification of the deposited film.
  Au, Ag, Cu and Al, deposited in the form of a thin film, have "as-grown" grains of a certain size; at a high temperature, aggregation, i.e., coalescence, is possible, with an increase in the size of the crystalline grain and consequent structural modification of the deposited film.

The intrinsic reorientation and coalescence phenomena mean that a highly reflective metal layer consisting of one of Au, Ag, Cu and Al, not itself being structurally stable, can compromise the structural stability of the entire coating in which it is inserted.

An additional problem related to the use of Au, Ag, Cu and Al in a solar absorber coating is the high diffusion coefficient of these metals in a wide class of materials typically used in solar receiver absorber coatings. This high diffusive behaviour of Au, Ag, Cu and Al deteriorates significantly as the temperature increases. In this case, the diffusion at the interface between metal (Au, Ag, Cu and Al) and cermet absorber involves modifications of the composition of the adjacent layers and possible chemical reactions between the different materials of the layers, with consequent deterioration of the properties of the infrared reflector and of the absorbing properties of the cermet. The poor chemical-physical stability of the absorber coating, due to the variation in the stoichiometry or composition of the cermet layers and of the infrared reflector, is enhanced at high temperatures and over long operating times.

In summary, as the operating temperature of a solar absorber coating increases, the use of high reflectance metals (such as Au, Ag, Cu and Al), in view of potentially improving the infrared reflectance of the coating, entails structural and chemical-physical instability of the coating with degradation of the photothermal performance over time.

Therefore, the use of Au, Ag, Cu and Al in a solar absorber coating, which is not only highly photothermally efficient but also highly durable, implies the need to "stabilize" these highly reflective metals, or to mitigate the issues connected with crystalline reorientation, coalescence and a high diffusion coefficient.

In order to obviate the problems connected with the use of Au, Ag, Cu and Al as an additional infrared reflecting layer 22a, the invention provides a whole series of innovations that comprise a multifunction structure 22 applied to the infrared reflecting base layer 21. This multifunction structure 22 consists of one or more reflecting layers defined as additional infrared reflecting layers 22a and made of metals selected from among Au, Ag, Cu and Al and one or more stabilizing layers 22b of materials suitably selected to perform one or more functions such as improving the intrinsic structural stability of the additional infrared reflecting layers 22a, acting as a barrier to the diffusion of the metals that make up the additional infrared reflecting layers 22a, thus improving the chemical-physical stability of the entire absorber coating 2, and acting as an adhesion layer for the absorbing multilayer cermet structure 23 above. Hence, the multilayer structure 22 of the invention is defined as a "multifunction structure" 22.

In this case, the above is achieved with the following, illustrated innovations.

The invention involves the adoption of additional infrared reflecting layers 22a of a thickness sufficiently great to ensure optical performance close to those of the "bulk" material, but sufficiently small to mitigate the intrinsic crystalline reorientation and coalescence.

In the only case of additional infrared reflecting layers 22a made of Ag, the invention involves improving the intrinsic stability of the material by manufacturing it by means of high power sputtering carried out in an atmosphere of argon gas+nitrogen, instead of the atmosphere of argon gas only typical of metal deposition. The high power makes it possible to have very energetic (high mobility) Ag atoms participate in the growth of the Ag layer but, at the same time, the additional nitrogen input allows only the most energetic atoms to participate in the film growth. In practice, the growth process will occur at high energy and a low growth rate, a preferential condition for the formation of a crystalline structure of the Ag film close to the ideal condition of formation of a single crystal (which has virtually no intrinsic recrystallization and coalescence).

As already illustrated, with particular reference to the embodiments in which the additional infrared reflecting layer or layers 22a consist of Au, Ag, Cu and Al, the invention stipulates that the stabilizing layer or layers 22b of the multifunction structure 22 can perform one or more functions such as:

improving the intrinsic structural stability of the highly reflective metal layer or layers 22a;

acting as a barrier to the diffusion of highly reflective metals;

acting as an adhesion layer for the absorbing multilayer cermet structure 23 above.

To perform these functions, the materials constituting the stabilizing layer or layers 22b of the multifunction multilayer structure 22 must be:

at a high temperature, stable and chemically inert with respect to the metals constituting the additional infrared reflecting layer or layers 22a;

transparent in the infrared spectral region or applied in the form of a sufficiently thin film, in order not to compromise the highly reflective optical behaviour of the entire multifunction structure 22;

sufficiently compact and, once applied to the additional infrared reflecting layer 22a, such as to ensure a conformal covering thereof;

capable of forming strong bonds at the interface with the metal of the additional infrared reflecting layer 22a so as to obtain strong adhesion between adjacent layers 22a and 22b.

Moreover, for strong adhesion between the multifunction structure 22 and the absorbing multilayer cermet structure 23, the only material constituting the last layer of the multifunction structure 22 must be able to form strong bonds at the interface with the cermet material of the absorbing multilayer cermet structure 23 above.

It should be noted that materials with such characteristics are potentially able to improve the intrinsic structural stability of Au, Ag, Cu and Al and to effectively block the diffusion processes of such highly reflective metals.

The invention identifies the materials that can be used to perform one or more functions such as improving the intrinsic structural stability of the metals of the additional infrared reflecting layers 22a, acting as a barrier to the diffusion of the metals of the additional infrared reflecting layers 22a, improving the chemical-physical stability of the entire absorber coating 2 and acting as an adhesion layer for the absorbing multilayer cermet structure 23 above.

The invention groups the above materials into the following categories: ceramic oxides, ceramic nitrides, oxide-based cermets, nitride-based cermets, transition metals and their alloys, and metallic behaviour nitrides.

With reference to the materials constituting the metal layers of the additional infrared reflecting layers 22a, it is possible to use medium-high reflectance metals (Mo and α-W) within the scope of the invention where the underlying infrared reflecting base layer 21 consists of a medium-reflectance material.

The excellent structural and chemical-physical stability and the low diffusion coefficient of Mo and W can be further improved by alternating, within a multifunction structure 22, these materials in the form of additional thin infrared reflecting layers 22a with ceramic, cermet, metal or metallic behaviour stabilizing layers 22b.

The use of these medium-high reflectance metals is preferable where one wishes to achieve the purpose of providing a spectrally selective absorber coating 2 for solar receivers that has at least aligned photothermal performance ($\alpha_s$, $\varepsilon_{th}$) and improved stability (durability, service life) with respect to the prior art of coatings for high temperature applications (up to at least 550° C.) in a vacuum ($p \leq 1 \times 10^{-4}$ mbar). Moreover, these medium-high reflectance metals are the best candidates for producing a spectrally selective solar absorber coating 2 with high versatility of use, being able to be used, with excellent photothermal performance (high $\alpha_s$, low $\varepsilon_{th}$) and high stability (durability, service life), in applications up to at least 300° C. in air.

In summary, the invention stipulates that the additional infrared reflecting layers 22a of the multifunction multilayer structure 22 of the spectrally selective solar absorber coating 2 consist of one or more metals selected from among Al, Cu, Ag, Au, Mo, and W.

For applications at a high temperature (up to at least 550° C.) in a vacuum ($p \leq 1 \times 10^{-4}$ mbar), where one wishes to obtain an absorber coating 2 with superior photothermal performance ($\alpha_s$ and $\varepsilon_{th}$) and stability (durability, service life) that is at least aligned with the prior art, the invention stipulates the use of Ag and Au as an additional infrared reflecting layer 22a in view of the low melting temperature of Al and the high diffusion coefficient of Cu with respect to Au and Ag.

In particular, taking into account the much lower cost of Ag than Au, preferred embodiments of the invention stipulate that the additional infrared reflecting layers 22a consist of Ag.

For applications at high temperatures (up to at least 550° C.) in a vacuum ($p \leq 1 \times 10^{-4}$ mbar), where one wishes to obtain an absorber coating 2 with at least aligned photothermal performance ($\alpha_s$ and $\varepsilon_{th}$) and improved stability (durability, service life) with respect to the prior art, preferred embodiments of the invention stipulate the use of Mo and α-W as an additional infrared reflecting layer 22a.

Finally, for applications up to at least 300° C. in air, where one wishes to obtain a particularly versatile absorber coating 2 with excellent photothermal performance (high $\alpha_s$, low $e_{th}$) and high stability (durability, service life), preferred embodiments of the invention stipulate the use of Mo and α-W as an additional infrared reflecting layer 22a.

As already shown, the invention groups the materials that can compose the stabilizing layers 22b into the following categories: ceramic oxides, ceramic nitrides, oxide-based cermets, nitride-based cermets, transition metals and their alloys, and metallic behaviour nitrides.

In this case, some embodiments of the invention stipulate that the stabilizing layers 22b are ceramic and, in particular, consist of an oxide of a transition metal selected from among Ti, V, Cr, Zr, Nb, Mo, Hf, Ta, W or a binary or ternary alloy of these transition metals, or of an oxide of Al or Si or of a binary alloy of Al and Si, or of a nitride of Al or Si or of a binary alloy of Al and Si. The thickness of each stabilizing layer 22b made of ceramic material preferably ranges between 5 and 120 nm. According to some preferred embodiments of the invention, the stabilizing layers 22b made of ceramic material consist of $Al_2O_3$, $SiO_2$, $Si_3N_4$, AlN, oxides and nitrides of binary alloys of Al and Si; in such preferred embodiments of the invention, $Al_2O_3$, $SiO_2$, $Si_3N_4$, AlN can be both in sub-stoichiometric and stoichiometric form.

Other embodiments of the invention stipulate that the stabilizing layers 22b are made of cermet and, in particular, are cermet in which the metal component consists of a transition metal selected from among Ti, V, Cr, Zr, Nb, Mo, Hf, Ta, W or a binary or ternary alloy of these transition metals, and in which the ceramic component consists of an oxide of Al or Si or of a binary alloy of Al and Si, or a nitride of Al or Si or of a binary alloy of Al and Si. The thickness of each stabilizing layer 22b made of cermet preferably ranges between 5 and 50 nm. According to some preferred embodiments of the invention, in the stabilizing layers 22b, the cermet consists of $Zr$—$SiO_2$, $Ti$—$AlN$, $Ti$—$Si_3N_4$, $Ta$—$Si_3N_4$, $Zr$—$Si_3N_4$, $Mo$—$Si_3N_4$, $W$—$Si_3N_4$, $Cr$—$Si_3N_4$.

Additional embodiments of the invention stipulate that the stabilizing layers 22b are metallic and, in particular, consist of a transition metal selected from among Ti, V, Cr, Zr, Nb, Mo, Hf, Ta, W or of a binary or ternary alloy of the above transition metals. The thickness of each metal stabilizing layer 22b preferably ranges between 5 and 20 nm. According to some preferred embodiments of the invention, the stabilizing layers 22b consist of Ti, binary alloys of Ti and W, binary alloys of Ta and W.

Finally, as final embodiments, the invention stipulates that the stabilizing layers 22b are made of metallic behaviour materials and, in particular, consist of a transition metal nitride selected from among Ti, V, Cr, Zr, Nb, Mo, Hf, Ta, W or of a nitride of a binary or ternary alloy of these transition metals. The thickness of each stabilizing layer 22b made of metallic behaviour material preferably ranges between 5 and 20 nm. According to some preferred embodiments of the invention, the stabilizing layers 22b consist of TiN, ZrN, NbN, MoN, TaN, WN, nitride of a binary alloy of Ti and Zr.

Taking into account all of the above, the stabilization of the additional infrared reflecting layer 22a within the multifunction multilayer structure 22 is achieved by using stabilizing layers 22b of suitably selected ceramic or cermet or metal or metallic behaviour materials.

In principle, several stabilizing layers 22b may be used for stabilizing the thin highly reflective metal layer 22a, usually of different materials and each capable of improving the intrinsic structural stability of the additional infrared reflecting layer 22a and/or of acting as a barrier to the diffusion of the metal of the additional infrared reflecting layer 22a and/or acting as an adhesion layer.

For the sake of simplicity, economy and speed of the manufacturing process of the "solar receiver" component, it is advantageous that the stabilization of the additional infrared reflecting layer 22a is achieved by the use of a single stabilizing layer 22b consisting of a material that performs all the above-mentioned functions.

The invention stipulates a minimum two-layer configuration for the multifunction structure 22; this is applied on the infrared reflecting base layer 21: a first additional infrared reflecting layer 22a and a second stabilizing layer 22b.

Preferred embodiments of the invention stipulate the use of a multifunction structure 22 consisting of a pair of layers formed from an additional infrared reflecting layer 22a and a stabilizing layer 22b made of ceramic material or by a pair of layers formed from an additional infrared reflecting layer 22a and a stabilizing layer 22b made of cermet material.

It is understood that, as shown above, the additional infrared reflecting layer 22a must have a thickness sufficiently great to ensure optical performance close to those of the "bulk" material, but sufficiently small to mitigate intrinsic crystalline reorientation and coalescence.

Using an additional, thin infrared reflecting layer 22a entails optical performance of infrared reflectance of the absorber coating 2, which is certainly increased with respect to those that can be obtained with just one infrared reflecting base layer 21. However, it can be further improved by repeating the number of "additional infrared reflecting layer 22a/stabilizing layer 22b made of ceramic material" pairs, or of "additional infrared reflecting layer 22a/stabilizing layer 22b made of cermet" pairs.

In other words, the infrared reflectance of the spectrally selective solar absorber coating 2 will increase as the number of "highly reflective metal layer 22a/ceramic layer 22b" pairs increases, i.e., "highly reflective metal layer 22a/cermet layer 22b" pairs, which make up the multifunction structure 22.

Whereas, in general, the invention stipulates that the multifunction structure 22 consists of a maximum number of layers equal to 30, arranged so as to increase the low emission thermal performance and stability of the spectrally selective solar absorber coating 2, in preferred embodiments of the invention, the multifunction structure 22 consists of a pair of "highly reflective metal layer 22a/ceramic layer 22b" layers, or of a pair of layers formed from "highly reflective metal layer 22a/cermet layer 22b", each pair repeated up to a maximum of 15 times. In such preferred embodiments, both the highly reflective metal layer 22a and the ceramic or cermet stabilizing layer 22b constituting the pair have a thickness ranging from 5 to 40 nm.

Absorbing Multilayer Cermet Structure 23

As noted above, in the invention the absorbing multilayer cermet structure 23 has the function of absorber of the spectrally selective solar absorber coating 2.

"Cermet" are composite materials consisting of a ceramic phase and a metal phase nanodispersed in each other. This particular structure confers cermets with the optical properties of high absorption in the spectral region of solar radiation and good transparency in the spectral region of thermal infrared, so as not to interfere with the infrared reflectance function of the underlying multifunction structure 22 and of the infrared reflecting base layer 21.

A cermet material, in order to be effectively used in the absorber coating 2 of the invention, must be equipped with high intrinsic stability and, therefore, the materials constituting its phases must have characteristics of high structural and chemical-physical stability at high temperatures. In addition, these materials must have a very low diffusion coefficient at high temperatures.

The invention identifies a series of materials constituting the metal phase of the cermet absorber of the absorbing multilayer cermet structure 23, which possess the characteristics described above. In some embodiments of the invention, the metal phase of the cermet consists of a transition metal selected from among Ti, V, Cr, Zr, Nb, Mo, Hf, Ta, W. In other embodiments, the metal phase of the cermet consists of a binary or ternary alloy of transition metals selected from among Ti, V, Cr, Zr, Nb, Mo, Hf, Ta, W.

The invention also identifies a series of materials constituting the ceramic phase of the cermet absorber of the absorbing multilayer cermet structure 23 that possess the characteristics described above. In some embodiments of the invention, the ceramic phase of the cermet is an oxide and, in particular, it consists of an Al oxide or a Si oxide or an oxide of a binary alloy of Al and Si. In other embodiments, the ceramic phase of the cermet is a nitride and, in particular, consists of an Al nitride or a Si nitride or a nitride of a binary alloy of Al and Si.

Within the context of the materials that the invention identifies as suitable and effective for constituting the metal phase and the ceramic phase of the cermet absorber, in preferred embodiments of the invention, the absorbing multilayer cermet structure 23 is composed of a transition metal selected from among Ti, Zr, Mo, W and a ceramic material consisting of an Al oxide. In additional preferred embodiments of the invention, the absorbing multilayer cermet structure 23 is composed of a transition metal selected from among Ti, Zr, Mo, W and a ceramic material consisting of an Al nitride.

Absorbing multilayer cermet structures 23 with an oxide ceramic component, are more difficult to manufacture than in the case of cermet with a nitride ceramic component.

To produce the cermet layers, the most used deposition technique is that of reactive co-sputtering, i.e., simultaneous sputtering, in argon gas+reactive gas ($O_2$, $N_2$), starting from targets of different materials, with at least one target capable of producing the metal component of the cermet and at least one target capable of producing the ceramic component of the cermet.

To obtain an oxide-based cermet with the desired optical properties, the amount of $O_2$ to be used in the deposition process must be sufficiently high to oxidize the metal of the ceramic component of the cermet, but sufficiently low to minimize the oxidation of the metal component of the cermet. In order to obtain stability and reproducibility of the process conditions, it is essential to implement reactive co-sputtering processes "in transition regime" that require reactive gas flushing control systems that are difficult to regulate due to the high reactivity of $O_2$.

In view of the difficult set-up for the oxide-based cermet manufacturing process, the use of these materials has an important advantage in terms of maximum achievable deposition rate compared to nitride-based cermets. In fact, the high reactivity of $O_2$ compared to $N_2$ makes it possible to oxidize a greater amount of metal per unit of time and, therefore, makes it possible to increase the deposition rate of the oxide-based cermets compared to the nitride-based ones.

As noted above, preferred embodiments of the invention provide for the use of cermet absorbers with a ceramic phase consisting of an Al oxide. The choice is motivated by the high structural and chemical-physical stability that this ceramic material has in a vacuum even at very high temperatures (well above 550° C.). In addition, this ceramic material is highly stable even in air at a high temperature (well above 300° C.), which makes it a material of choice for use as a ceramic phase of the cermet of the absorbing multilayer cermet structure 23 of the absorber coating 2 of the invention for applications in non-evacuated or air-operating receivers.

Absorbing multilayer cermet structures 23 with materials with a nitride ceramic component, are easier to manufacture than in the case of cermet with an oxide ceramic component.

To obtain a nitride-based cermet with the desired optical properties, the amount of $N_2$ to be used in the deposition process must be sufficiently high to nitride the metal of the ceramic component of the cermet, but sufficiently low to minimize the nitriding of the metal component of the cermet. Due to the low reactivity of $N_2$, it is possible to implement reactive co-sputtering processes with high stability and reproducibility, both "in transition regime" and "in saturation regime".

In the case of processes in transition, although a system for controlling the flushing of reactive gas remains necessary, its management is simpler to regulate, allowing a higher deposition rate than in the case of processes in saturation. It is understood that the reactive co-sputtering processes in saturation for the manufacture of cermet based on nitrides are absolutely advantageous for simplicity of set-up and high repeatability.

As noted above, preferred embodiments of the invention stipulate the use of cermet absorbers with a ceramic phase consisting of an Al nitride; the choice is motivated by the high structural and chemical-physical stability that this ceramic material has in a vacuum even at very high temperatures (well above 550° C.).

The absorbing multilayer cermet structure 23 of the invention can be formed from a single cermet layer or from several cermet layers, up to a maximum of 40.

The use of several cermet layers makes it possible to minimize the optical mismatch that the solar radiation encounters propagating inside the absorber coating 2 and, therefore, to maximize the absorption of the solar radiation by the absorbing multilayer cermet structure 23. In order to obtain this optical behaviour, the invention has a suitable volume-fraction profile of the cermet layers' metal component, $V_{met}/(V_{met}+V_{cer})$; in some preferred embodiments of the invention, the volume fraction of the metal component of the cermet layers decreases in the direction that goes from the underlying multifunction structure 22 to the above anti-reflection multilayer structure 24 of the absorber coating 2.

Finally, the invention stipulates that the absorbing multilayer cermet structure 23 preferably has a thickness of from 5 to 120 nm and, in any case, no greater than 200 nm.

Anti-Reflection Multilayer Structure 24

In the invention, the anti-reflection multilayer structure 24, consisting of one or more ceramic or cermet layers or of a combination of the same layers, has the anti-reflection filter function, i.e., the function of minimizing the reflection of the solar radiation hitting the receiver. This function is achieved either by reducing the optical mismatch between the last layer of the absorbing multilayer cermet structure 23 and the solar radiation propagation medium or by applying the principles of interferometry.

Preferably, in order to effectively perform the anti-reflection filter function, the principles of interferometry are applied. Having transparent materials available with very different refractive indices makes it possible to create optically more efficient "interferential" anti-reflection filters in minimizing the solar radiation reflected by the coating 2, maximizing absorption thereof. In this field, the use of cermet layers in the anti-reflection multilayer structure 24 offers the advantage of layers with higher refractive indices compared to the use of ceramic layers alone. Adequate increases in the refractive index of a cermet layer are already obtained with low volume fractions of the metal component of the cermet, with the advantage of low absorption by the layers that compose the filter itself. As illustrated, the invention stipulates that each cermet layer of the anti-reflection multilayer structure 24 is characterized by a constant volume fraction of the metal component and ranges between 0.01 and 0.3.

The invention fixes the maximum number of layers constituting the anti-reflection multilayer structure 24 at 20, in this case of the interference type, since this number is sufficient to design and produce an optical filter with the desired characteristics.

A material, in order to be used in the anti-reflection multilayer structure 24 of the invention, must be provided with high intrinsic stability and, in other terms, must have characteristics of high structural and chemical-physical stability at high temperatures and, in addition, it must have a very low diffusion coefficient in adjacent layers at high temperatures.

The invention identifies a series of ceramic and cermet materials suitable for constituting the anti-reflecting layers due to their optical characteristics (refractive indices), stability, and limited tendency to diffuse.

In this case, some embodiments of the invention stipulate that the anti-reflection multilayer structure 24 of the absorber coating 2 comprises ceramic layers consisting of an oxide of a transition metal selected from among Ti, V, Cr, Zr, Nb, Mo, Hf, Ta, or W or a binary or ternary alloy of these transition metals, or an Al or Si oxide or a binary alloy of Al and Si, or from an Al or Si nitride or a binary alloy of Al and Si. The invention stipulates that the thickness of each ceramic layer ranges between 1 and 200 nm, preferably between 5 and 120 nm. According to some preferred embodiments of the invention, the ceramic layers of the anti-reflection structure 24 consist of $Al_2O_3$, $SiO_2$, $Si_3N_4$, AlN.

Other embodiments of the invention stipulate that the anti-reflection multilayer structure 24 of the absorber coating 2 comprises cermet layers in which the metal component consists of a transition metal selected from among Ti, V, Cr, Zr, Nb, Mo, Hf, Ta, or W or a binary or ternary alloy of these transition metals, and in which the ceramic component consists of an Al or Si oxide or a binary alloy of Al and Si, or an Al or Si nitride, or a binary alloy of Al and Si. The invention stipulates that the thickness of each cermet layer ranges between 1 and 120 nm, preferably between 1 and 50 nm. According to some preferred embodiments of the invention, the cermet layers of the anti-reflection structure 24 are composed of a transition metal selected from among Ti, Zr, Mo, W and a ceramic material consisting of an Al oxide or nitride.

In some embodiments, the spectrally selective solar absorber coating of the invention can operate in a vacuum ($p \leq 1 \times 10^{-4}$ mbar) up to a maximum temperature of at least 550° C. In such embodiments, the spectrally selective solar absorber coating of the invention is characterized by excellent performance in terms of high solar absorbance and low thermal emissivity, high temperature performance (up to at least 550° C.) higher than those of the prior art. In addition, in such embodiments, the spectrally selective solar absorber coating of the invention is durable for a service life of 25 years, demonstrating excellent stability in a vacuum up to at least 550° C.

In additional embodiments, the spectrally selective solar absorber coating of the invention can operate in air up to a maximum temperature of at least 300° C. In such embodiments, the spectrally selective solar absorber coating of the invention is characterized by excellent performance in terms of high solar absorbance and low thermal emissivity. In addition, in such embodiments, the spectrally selective solar absorber coating of the invention is durable for a service life of 25 years, demonstrating high stability in air up to at least 300° C.

Providing a versatile spectrally selective solar absorber coating for effective use both for applications in a vacuum, up to at least 550° C., and for applications in air, up to at least 300° C., is a plus with respect to the prior art of absorber coatings for solar receivers.

Process for Making the Absorber Coating

The invention also relates to a process for producing the spectrally selective solar absorber coating 2, which is the main subject of the invention, by means of physical vapour deposition (PVD) techniques, and, in particular, by sputtering techniques at a high deposition rate.

In this case, these are i) magnetron sputtering and co-sputtering techniques, in argon gas, by metal targets and ii) magnetron reactive sputtering and co-sputtering techniques, in argon gas+reactive gas ($O_2$, $N_2$), by metal targets.

The invention stipulates that the sputtering depositions are carried out at a pressure ranging from $5 \times 10^{-4}$ mbar to $5 \times 10^{-2}$ mbar, and, in particular, at a pressure ranging from $1 \times 10^{-3}$ mbar to $2 \times 10^{-2}$ mbar.

It should be noted that, in the invention, "co-sputtering" refers to the simultaneous sputtering, in argon gas, starting from targets of different materials, whereas "reactive co-sputtering" refers to simultaneous sputtering, in argon gas+ reactive gas ($O_2$, $N_2$), starting from targets of different materials.

With reference to the structure of the spectrally selective solar absorber coating 2 of the invention, the manufacturing process comprises the following steps:
  providing a substrate 1;
  applying the infrared reflecting base layer 21 to all or part of the surface of the substrate 1 by sputtering techniques;
  applying the multifunction structure 22 to the infrared reflecting base layer 21 by sputtering techniques;
  applying the absorbing multilayer cermet structure 23 to the multifunction structure 22 by sputtering techniques;
  applying the anti-reflection multilayer structure 24 to the absorbing multilayer cermet structure 23 using sputtering techniques.

In the invention, the substrate 1 is part of the solar receiver.

In many embodiments of the invention, the substrate 1 consists of a metal or an alloy and, in particular, consists of steel.

In preferred embodiments of the invention, the substrate 1 consists of the steel pipe of the receiver of a solar thermal or thermodynamic system with parabolic or Fresnel linear manifolds.

In the case of a tubular-shaped substrate 1, typically the substrate 1 is rotated about its own axis during the sputtering deposition process so as to apply the layers of the spectrally selective solar absorber coating 2 over the entire outer surface of the pipe; in this case, the pipe-substrate 1 rotates opposite the sputtering sources, i.e., in front of the electrodes consisting of magnetron cathodes.

The invention stipulates that the sputtering deposition process of the absorber coating 2 may be preceded by a thermal or plasma pretreatment of the substrate 1, typically of Ar, or by a combination of one or more thermal or plasma pretreatments.

The possible thermal pretreatment of the substrate is carried out in a vacuum at a pressure lower than $5\times10^{-4}$ mbar, in particular preferably lower than $1\times10^{-4}$ mbar, and so as to bring the substrate 1 to a temperature ranging between 100° C. and 300° C.

The possible plasma pretreatment is carried out, typically in Ar gas, at a pressure below $5\times10^{-2}$ mbar by means of substrate 1 polarization or at a pressure below $5\times10^{-3}$ mbar by means of an ion source capable of carrying out a high-energy ion bombardment of the substrate 1.

In the case of a tubular substrate 1, this generally rotates including during the possible pretreatments so as to uniformly and effectively condition the entire surface on which the sputtering deposit will be carried out.

The sputtering processes, which the invention stipulates for the application of the various categories of materials that constitute the layers of the spectrally selective solar absorber coating 2, which is the main subject of the invention, are described below. In other words, the sputtering processes stipulated by the process for manufacturing the invention will be "catalogued" according to the material to be deposited, because the choice and definition of the specific process essentially depend on the type of material to be manufactured.

The invention involves a method for producing the spectrally selective solar absorber coating 2 in which the metal layers consisting of a transition metal or a highly reflective metal are applied by means of magnetron sputtering technique, in Ar gas, by targets of the above-mentioned transition metal or of the above-mentioned highly reflective metal. In the case where the additional infrared reflecting layer consists of Ag, for the reasons illustrated in the preceding paragraph, this layer can be produced by means of magnetron sputtering technique, in $Ar+N_2$ gas, by Ag targets.

The invention stipulates that metal layers consisting of a binary or ternary alloy of transition metals are applied by means of magnetron sputtering technique, in Ar gas, by targets formed from the specific alloy of interest, or by means of magnetron co-sputtering technique, in Ar gas, by targets of the individual metals forming the alloy. In this case, the desired composition of the alloy will be obtained by suitably varying the feeding power of the targets of the individual metals.

The invention stipulates that metal behaviour layers consisting of a transition metal nitride are applied by means of magnetron reactive sputtering technique, in $Ar+N_2$ gas, by targets of the above-mentioned transition metal.

The invention stipulates that metal behaviour layers consisting of a nitride of a binary or ternary alloy of transition metals are applied by means of magnetron reactive sputtering technique, in $Ar+N_2$ gas, by targets formed from the specific alloy of interest, or by means of magnetron reactive co-sputtering in $Ar+N_2$ gas by targets of the individual metals fed at suitable powers.

The invention stipulates that ceramic layers consisting of an oxide of a transition metal or an oxide of Al or Si are applied by means of magnetron reactive sputtering, in $Ar+O_2$ gas, by targets of the above-mentioned transition metal or by targets of Al or Si.

The invention stipulates that ceramic layers consisting of an oxide of a binary or ternary alloy of transition metals or an oxide of a binary alloy of Al and Si are applied by means of magnetron reactive sputtering, in $Ar+O_2$ gas, by targets formed from the specific alloy of interest, or by means of magnetron reactive co-sputtering, in $Ar+O_2$ gas, by targets of the individual metals forming the alloy fed at suitable powers.

The invention stipulates that ceramic layers consisting of an Al or Si nitride are applied by means of magnetron reactive sputtering, in $Ar+N_2$ gas, by targets of Al or Si.

The invention stipulates that ceramic layers consisting of a nitride of a binary alloy of Al and Si are applied by means of magnetron reactive sputtering, in $Ar+N_2$ gas, by targets formed from the specific alloy of interest, or by means of magnetron reactive co-sputtering, in $Ar+N_2$, gas by targets of Al and Si fed at suitable powers.

To produce the cermet layers, the invention stipulates implementing the deposition technique of reactive co-sputtering, i.e., simultaneous sputtering, in Ar gas+reactive gas ($O_2$, $N_2$), starting from targets of different materials, with at least one target capable of producing the metal component of the cermet and at least one target capable of producing the ceramic component of the cermet.

In this case, the invention stipulates that cermet layers, with a metal component consisting of a transition metal or a binary or ternary alloy of transition metals and with a ceramic component consisting of an Al or Si oxide or an oxide of a binary alloy of Al and Si, are applied by a magnetron reactive co-sputtering technique, in $Ar+O_2$ gas, starting from the following targets:

for the deposition of the transition metal or, respectively, of the binary or ternary alloy of transition metals:
  i. target of the transition metal;
  ii. target of the above-mentioned binary or ternary alloy of transition metals, or target of the individual metals forming the alloy of interest fed at suitable powers;
for the deposition of the Al or Si oxide or, respectively, of the oxide of the binary alloy of Al and Si:
  iii. target of Al or target of Si;
  iv. target of the above-mentioned binary alloy of Al and Si, or target of Al and Si fed at suitable powers.

The invention stipulates that cermet layers, with a metal component consisting of a transition metal or a binary or ternary alloy of transition metals and with a ceramic component consisting of an Al or Si nitride or a nitride of a binary alloy of Al and Si, are applied by a magnetron reactive co-sputtering technique in $Ar+N_2$ gas, starting from the following targets:

for the deposition of the transition metal or, respectively, of the binary or ternary alloy of transition metals:
  i. target of the transition metal;
  ii. target of the above-mentioned binary or ternary alloy of transition metals, or target of the individual metals forming the alloy of interest fed at suitable powers;
for the deposition of Al or Si nitride or, respectively, of the nitride of the binary alloy of Al and Si:
  iii. target of Al or target of Si;
  iv. target of the above-mentioned binary alloy of Al and Si, or target of Al and Si fed at suitable powers.

In order to preserve the structural and optical properties of the cermet layers based on oxides/nitrides, the reactive co-sputtering deposition process must be carried out in such a way that the amount of $O_2/N_2$ is sufficiently high to oxidize/nitride the metal of the ceramic component of the cermet, but low enough to minimize oxidation/nitriding of the metal component of cermet. Otherwise, the presence of an oxidized metal component inside the cermet could cause problems of structural instability due to the possible formation of volatile oxides at a high temperature with consequent fracturing of the spectrally selective solar absorber coating 2. In the case of nitride-based cermet, on the other hand, the formation of a nitrated metal component, MyNz, could cause structural instability problems of the spectrally selective solar absorber coating 2 due to possible high-temperature disproportionation or re-adjustment of the crystalline structure of the metallic behaviour nitride MyNz. In addition, with particular reference to the layers of the absorbing multilayer cermet structure 23, the presence of an oxidized/nitrated metal component inside the cermet would lead to a significant reduction in the absorption power of the cermet, with a reduction in the photothermal performance of the spectrally selective solar absorber coating 2.

As a direct consequence of the problem illustrated, in the reactive co-sputtering processes for producing the cermet layers, it is appropriate to introduce $O_2/N_2$ at the targets used to deposit the ceramic component of the cermet.

As regards the above-mentioned magnetron reactive sputtering and co-sputtering techniques, used for the application of the ceramic layers and the cermet layers of the spectrally selective solar absorber coating 2, the invention stipulates that these are carried out "in transition regime" by means of a system for controlling the flow of reactive gas, in particular by means of PEM (Plasma Emission Monitoring) or CVM (cathode Voltage Monitoring) control systems. The use of magnetron reactive sputtering and co-sputtering techniques carried out "in transition regime" makes it possible to maximize the deposition rate of the ceramic layers and the cermet layers.

The invention stipulates that the above-mentioned magnetron reactive sputtering and co-sputtering techniques, used for the application of the ceramic layers and for the application of the cermet layers with a ceramic component consisting of nitrides of the spectrally selective solar absorber coating 2, can also be carried out "in saturation regime". The magnetron reactive sputtering and co-sputtering techniques "in saturation regime", although less rapid than the "in transition regime" techniques, allow the implementation of deposition processes with simpler set-up and high repeatability.

The high deposition rate, attainable with the sputtering techniques stipulated by the invention, positively influences the productivity and, ultimately, facilitates the product's cost-effectiveness for mass production of the component.

Detailed Description of Two Preferred Embodiments

Two preferred embodiments of the invention will be described below.

In the two preferred embodiments of the invention, the substrate 1 consists of steel, in particular it consists of the steel pipe of the receiver of a solar thermal or thermodynamic system with parabolic or Fresnel linear manifolds.

In the two preferred embodiments, suitable for applications at a high temperature (up to at least 550° C.) in a vacuum ($p \leq 1 \times 10^{-4}$ mbar), the infrared reflecting base layer 21 consists of W in crystalline phase α (α-W) for its good infrared reflectance, high structural and chemical-physical stability, excellent adhesion properties, in particular on steel, excellent performance as a barrier layer for diffusion of the steel alloying elements, and low elemental diffusion coefficient in the above layers.

The thickness of the metal infrared reflecting base layer 21 consisting of α-W is equal to 120±20 nm.

In the two preferred embodiments, the two additional infrared reflecting layers 22a both consist of Ag for the excellent infrared reflectance that makes it possible to obtain a spectrally selective solar absorber coating 2 with greater photothermal performance ($α_s$ and $ε_{th}$) than in the prior art.

The thickness of the additional infrared reflecting layers 22a is equal to 20±10 nm, and ensures optical performance close to those of the "bulk" Ag and is small enough to mitigate intrinsic instability once these are inserted in the four-layer multifunction structure 22.

In a first of the two preferred embodiments, the two stabilizing layers 22b consist of AlN, while in a second of the two preferred embodiments, the two stabilizing layers 22b consist of $Al_2O_3$.

The thicknesses of the stabilizing layers 22b of the first and second embodiments are equal to 15±10 nm.

In the first preferred embodiment, the layers of the absorbing multilayer cermet structure 23 are composed of W and AlN. W—AlN cermet layers, besides having optical characteristics perfectly suitable for the function of absorber, are equipped with high structural and chemical-physical stability at a high temperature in a vacuum and a very low diffusion coefficient of the metal and ceramic components. In addition, absorbing multilayer cermet structures with a nitride ceramic component, are easier to manufacture compared to absorbing multilayer cermet structures with an oxide ceramic component.

In the second preferred embodiment, the layers of the absorbing multilayer cermet structure 23 are composed of W and Al. W—$Al_2O_3$ cermet layers, besides having optical characteristics perfectly suitable for the function of absorber, are equipped with high structural and chemical-physical stability at high temperatures in a vacuum and a very low diffusion coefficient of the metal and ceramic components. In addition, W—$Al_2O_3$ cermets have a high stability even in air at a high temperature (well above 300° C.), which makes them a material of choice for use in the spectrally selective solar absorber coating 2 for applications in non-evacuated or air-operating receivers.

The absorbing multilayer cermet structure 23, has a volume-fraction profile of the cermet layers' metal component, $V_{met}/(V_{met}+V_{cer})$, decreasing in the direction that goes from the underlying multifunction structure 22 to the anti-reflection multilayer structure 24 above. The volume fraction of the metal component of the cermet layers starts from a value preferably ranging between 0.3 and 0.7, and in particular preferably ranging between 0.45±0.15, and decreases to a value preferably ranging between 0.1 and 0.4, and, in particular, preferably ranging between 0.25±0.1.

The absorbing multilayer cermet structure 23 is formed of a maximum of 40 layers, and its thickness is 60±30 nm.

The anti-reflection multilayer structure 24 of the two embodiments of the invention consists of ceramic layers and cermet layers.

The ceramic layers consist of $Al_2O_3$, $SiO_2$ and AlN due to their optical characteristics (refractive indices) and stability and their thickness ranges between 5 and 120 nm.

The cermet layers of the anti-reflection multilayer structure (24) consist of W and AlN or of W and $Al_2O_3$. The thickness of each cermet layer ranges between 1 and 50 nm. Each of the cermet layers is characterized by a volume fraction of the metal component that is constant and not higher than 0.3.

In particular, the anti-reflection multilayer structures of both embodiments consist of two ceramic layers and a cermet layer. In these embodiments, the principles of interferometry are applied to obtain an anti-reflection multilayer structure 24 that effectively performs an anti-reflection filter function.

Table I shows the composition of the anti-reflection multilayer structures of the two embodiments.

TABLE I

|  | Preferred embodiment No. 1 | Preferred embodiment No. 2 |
|---|---|---|
| I Anti-reflecting layer | AlN | $Al_2O_3$ |
| II Anti-reflecting layer | W—AlN | W—$Al_2O_3$ |
| III Anti-reflecting layer | $SiO_2$ | $SiO_2$ |

The first embodiment is to be preferred where the absorbing multilayer cermet structure 23 is of the W—AlN type, the second where the absorbing multilayer cermet structure 23 is of the W—$Al_2O_3$ type.

For a more complete understanding of the two embodiments described above, Table II shows the complete structure of each spectrally selective solar absorber coating 2.

TABLE II

|  |  | No. 1 | No. 2 |
|---|---|---|---|
| Infrared reflecting base layer 21 |  | α-W | α-W |
| Multifunction structure 22 | Additional infrared reflecting layer 22a | Ag | Ag |
|  | Stabilizing layer 22b | AlN | $Al_2O_3$ |
|  | Additional infrared reflecting layer 22a | Ag | Ag |
|  | Stabilizing layer 22b | AlN | $Al_2O_3$ |
| Absorbing multilayer cermet structure 23 |  | W—AlN | W—$Al_2O_3$ |
| Anti-reflection multilayer structure 24 | I Anti-reflecting layer | AlN | $Al_2O_3$ |
|  | II Anti-reflecting layer | W—AlN | W—$Al_2O_3$ |
|  | III Anti-reflecting layer | $SiO_2$ | $SiO_2$ |

It should be noted that the embodiments illustrated in Table II, essentially characterized by a four-layer multifunction structure 22 (consisting of two "additional infrared reflecting layer 22a/stabilizing layer 22b" pairs), fall within the wider scope of preferred embodiments of the invention that stipulate a multifunction structure 22 consisting of a single "additional infrared reflecting layer 22a/stabilizing layer 22b" pair or the same "additional infrared reflecting layer 22a/stabilizing layer 22b" pair repeated up to a maximum of 15 times.

In the particularly preferred embodiments of the invention just illustrated, the spectrally selective absorber coating 2 of the invention is able to operate in a vacuum (p≤1×10$^{-4}$ mbar) up to a maximum temperature of at least 550° C. In such embodiments, the absorber coating of the invention is characterized by excellent performances in terms of high solar absorbance and low thermal emissivity, performance at high temperatures (up to at least 550° C.) higher than those of the prior art. In addition, in such embodiments, the absorber coating of the invention is durable for a service life of 25 years, showing excellent vacuum stability up to at least 550° C.

The invention claimed is:

1. A spectrally selective solar absorber coating for a receiver of a solar thermal or thermodynamic system, the spectrally selective solar absorber comprising in sequence:
    an infrared reflecting multilayer structure;
    an absorbing multilayer cermet structure; and
    an anti-reflection multilayer structure;
    wherein the infrared reflecting multilayer structure comprises:
        (i) an infrared reflecting base layer with a barrier and adhesion layer function, which is designed to be, in use, in contact with a substrate, which is part of the receiver; said infrared reflecting base layer consisting of one or more transition metals selected from among Ti, V, Cr, Zr, Nb, Hf, Ta, Mo, W or of a nitride of one or more of said transition metals; and
        (ii) a multifunction structure, which is placed on said infrared reflecting base layer and comprising at least:
            multiple additional infrared reflecting layers with the function of increasing the infrared reflectance of the absorber coating, each of which consists of a metal selected from among Au, Ag, Cu, Al, Mo and W, and
            multiple stabilizing layers for said additional infrared reflecting layer, each of which consists of
                a ceramic material;
                a cermet material; or
                a material consisting of one or more transition metals or of a nitride of one or more of said transition metals;
        said additional infrared reflecting layers and said multiple stabilizing layers being arranged so that one reflecting layer alternates with one or more stabilizing layers;
        one of said stabilizing layers being placed in contact with said absorbing multilayer cermet structure.

2. The solar absorber coating according to claim 1, wherein said additional infrared reflecting layers and said stabilizing layers are arranged in an alternated position relative to one another.

3. The solar absorber coating according to claim 1, wherein said stabilizing layer consists of one or more transition metals selected from among Ti, V, Cr, Zr, Nb, Mo, Hf, Ta, W or of a nitride of one or more of said transition metals.

4. The solar absorber coating according to claim 1, wherein said ceramic material of the stabilizing layer is chosen from the group consisting of:
    oxide of one or more transition metals selected from among Ti, V, Cr, Zr, Nb, Mo, Hf, Ta, W
    Al and/or Si oxide; and
    Al and/or Si nitride.

5. The solar absorber coating according to claim 1, wherein the cermet material of said stabilizing layer is made up of a metal material consisting of one or more transition metals selected from among Ti, V, Cr, Zr, Nb, Mo, Hf, Ta, W; and of a ceramic material selected between Al and/or Si oxide or nitride.

6. The solar absorber coating according to claim 1, wherein said infrared reflecting base layer has a thickness ranging from 1 to 250 nm; said additional infrared reflecting layer has a thickness ranging from 1 to 250 nm; said stabilizing layer consisting of said ceramic material has a thickness ranging from 1 to 200 nm; said stabilizing layer consisting of said cermet material has a thickness ranging from 1 to 120 nm; said stabilizing layer made up of said material consisting of one or more transition metals or of a nitride of one or more transition metals has a thickness ranging from 1 to 50 nm.

7. The solar absorber coating according to claim 1, wherein said infrared reflecting base layer has a thickness ranging from 90 to 150 nm; said additional infrared reflecting layer has a thickness ranging from 5 to 120 nm; said stabilizing layer consisting of said ceramic material has a thickness ranging from 5 to 120 nm; said stabilizing layer consisting of said cermet material has a thickness ranging from 5 to 50 nm; said stabilizing layer made up of said material consisting of one or more transition metals or of a nitride of one or more transition metals has a thickness ranging from 5 to 20 nm.

8. The solar absorber coating according to claim 1, wherein the absorbing multilayer cermet structure comprises at least one cermet layer consisting of a metal material consisting of one or more transition metals selected from among Ti, V, Cr, Zr, Nb, Mo, Hf, Ta, W, and of a ceramic material selected between an Al and/or Si oxide or nitride.

9. The solar absorber coating according to claim 1, wherein said anti-reflection multilayer structure comprises at least a ceramic layer and at least one cermet layer.

10. The solar absorber coating according to claim 9, wherein the ceramic layer of the anti-reflection multilayer structure consists of an oxide of one or more transition metals selected from among Ti, V, Cr, Zr, Nb, Mo, Hf, Ta, W; or of an Al and/or Si oxide or nitride.

11. The solar absorber coating according to claim 9, wherein the at least one cermet layer of the anti-reflection multilayer structure is made up of a metal material consisting of one or more transition metals selected from among Ti, V, Cr, Zr, Nb, Mo, Hf, Ta, W, and of a ceramic material selected between an Al and/or Si oxide or nitride.

12. The solar absorber coating according to claim 11, wherein said cermet layer of the anti-reflection multilayer structure has a volume fraction of said metal material ranging from 0.01 to 0.3.

13. A receiver for of solar thermal or thermodynamic systems comprising a substrate and the spectrally selective solar absorber coating according to claim 1.

14. The receiver according to claim 13, configured as a receiver tube.

15. The receiver according to claim 14, configured as an evacuated receiver pipe.

16. The receiver according to claim 14, configured as is a non-evacuated or air-operating receiver pipe.

17. A procedure to manufacture a spectrally selective solar absorber coating according to claim 1, the procedure comprising:
applying said infrared reflective base layer on all or part of the surface of a substrate by physical vapor deposition (PVD) techniques;
applying a multifunction structure on said infrared reflective base layer by physical vapor deposition (PVD) techniques; said multifunction structure comprising at least:
an additional infrared reflecting layer with the function of increasing the infrared reflectance of the absorber coating, which consists of a metal selected from among Au, Ag, Cu, Al, Mo and W, and
a stabilizing layer for said additional infrared reflecting layer, which consist of
a ceramic material; or
a cermet material; or
a material consisting of one or more transition metals or of a nitride of one or more of said transition metals;
applying an absorbing multilayer cermet structure on said stabilizing layer by physical vapor deposition (PVD) techniques; and
applying an anti-refection multilayer structure on said absorbing multilayer cermet structure by physical vapor deposition (PVD) techniques.

18. The procedure according to claim 17, further comprising at least a pre-treatment of said substrate before applying said infrared reflective base layer, said pre-treatment being a thermal treatment or a plasma treatment or a combination thereof.

* * * * *